March 16, 1943. J. MULLER 2,314,237
LAMINATED SOLE CONSTRUCTION
Filed July 13, 1939

INVENTOR.
Jacques Muller.
BY Bernard Jahn
ATTORNEY.

Patented Mar. 16, 1943

2,314,237

UNITED STATES PATENT OFFICE 2,314,237

LAMINATED SOLE CONSTRUCTION

Jacques Muller, Crepieu Ain, France

Application July 13, 1939, Serial No. 284,182
In France January 12, 1939

11 Claims. (Cl. 36—30)

This invention relates to a laminated composite sole construction for shoes or the like, which will not readily come apart when in use and which is more durable and more flexible than those heretofore known.

An object of this invention is to provide a novel laminated sole composed of alternate strips of light weight material, such as cork or the like, and resilient material, such as crepe rubber or the like, which are joined together in a novel manner to provide a sturdy, durable and not easily separable laminated sole. The rubber laminations supply flexibility and a strong binding quality between the parts while the cork laminations provide for light weight of the finished sole.

Another object of this invention is to provide a light weight composite laminated sole which is provided with a highly durable layer of sole leather or the like on the side that contacts the ground to make for long wear of the sole.

A further object of this invention is to make the highly durable ground contacting layer of the sole flexible to conform to the foot movements by constructing it of complementary and interfitting strips. The strips are cut along a curved or zig-zag path so that the spaces between them will not be greatly widened when the sole is bent in use.

A still further object of this invention is to provide an efficient construction for joining the laminations of cork and crepe rubber into a composite unitary structure that will not readily separate when in use.

A more specific object of this invention is to provide a laminated sole composed of a series of cork blocks bonded in a boxlike manner by rubber on three sides thus forming cork cells throughout the whole sole construction.

Despite the relatively great thickness of the laminated sole applicant's construction provides light weight, durability and great flexibility.

The above and other objects and advantages of applicant's invention will become apparent as the description thereof proceeds, reference being had to the accompanying drawing wherein.

Figure 1:
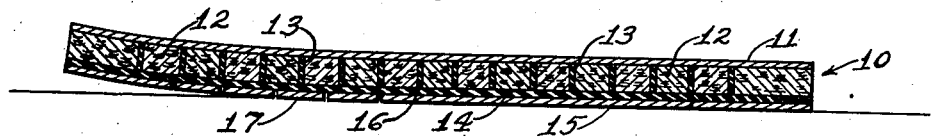
Figure 1 is a longitudinal vertical section taken on the line 1—1 of Fig. 2.
Figure 2:
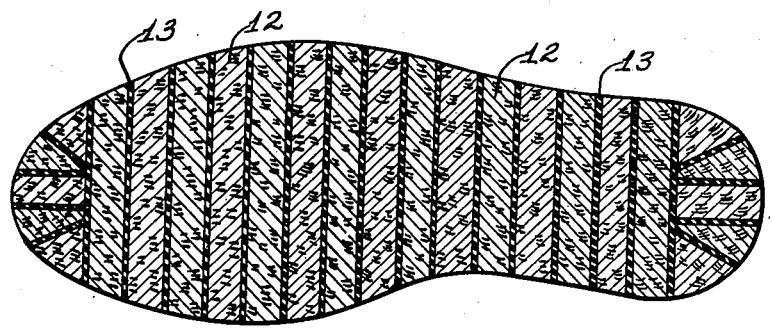
Fig. 2 is a longitudinal plan section taken on the line 2—2 of Figure 1.
Figure 3:
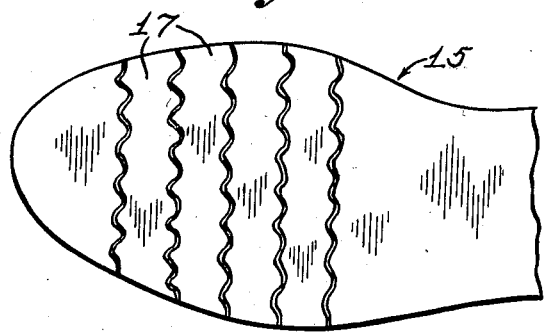
Fig. 3 is a plan view looking up of the front part of the sole.

The laminated sole generally indicated by 10 is composed of a top layer 11 of any suitable material, such as leather, a composition or cloth; a relatively thick main body composite layer of large cork blocks or the like 12 separated by narrow crepe rubber strips or the like 13 with a relatively thin layer of crepe rubber or the like 14 which directly contacts and is cemented to the bottoms of the cork blocks and the edge of the rubber strips; and a bottom wear resisting layer 15 of sole leather or the like. All of these layers are glued or cemented together in any known manner to form the composite laminated sole of this invention.

Figure 5:
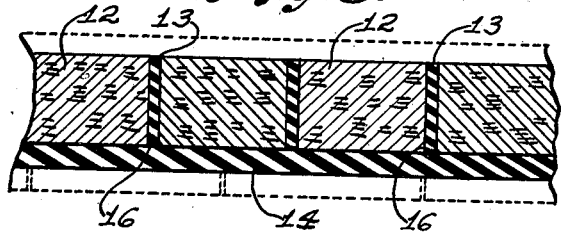
Fig. 5 is an enlarged sectional view partly diagrammatic of a portion of Figure 1.

The cork blocks 12 and rubber strips 13 are cemented to each other at their sides to make a strong unitary construction. Because of the dissimilarity of materials the glueing or cementing between the cork and rubber is often not quite satisfactory. In order to overcome any impairment of strength due to such construction, the layer 14 is made of the same material, in this case rubber, as the strips 13 and the contacting areas between the layer 14 and lower edges of strips 13 are particularly cemented together at areas 16 by a suitable rubber cement. This is clearly illustrated on Figure 5. This construction thus provides individual three sided boxes for each block of cork. The cork blocks are now held firmly in place by the directly cemented connections between the cork and the rubber and by the fact that they are encased in the three sided rubber boxes.

It is evident from the construction that each of the cork blocks is completely surrounded and never contacts the ground or the foot of the wearer. The sole would not be long wearing if the cork blocks were allowed to contact the ground directly.

Figure 4:
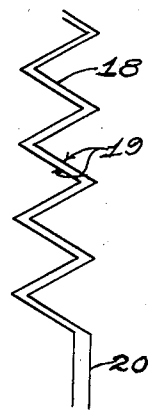
Fig. 4 is a diagrammatic view of the joining line between two adjoining strips on Fig. 3 to illustrate the advantage of a winding joining line over a straight one.

In order to provide great flexibility for the bottom layer 15, it is cut into strips 17. These strips may be cut straight, but preferably they are cut along a winding or zig-zag path in order to avoid too great a gap between the strips as the sole is flexed with the movement of the foot. The reason for this is clearly illustrated by Figure 4. The zig-zag portion 18 provides a comparatively narrow space between the strips as illustrated at 19, whereas the straight portion 20 provides a relatively wide space. With the narrow space between strips, foreign matter does not readily enter the space to undermine the sole construction.

Applicant's laminated sole construction as described and shown is of light weight because of cork blocks. It is flexible because of the rubber strips between the cork blocks and because of the separate strips forming the bottom layer. It is resilient because of the intermediate rubber layer 14. It is strong because of the individual boxlike units for the cork blocks. It is durable because of the heavy sole leather bottom layer and because the cork blocks never contact the ground or the foot of the wearer.

I do not wish to be limited to the exact details of construction and arrangement of laminations as shown. All equivalent constructions as may fall within the scope of the appended claims are meant to be included.

I claim:

1. In a laminated sole construction a top layer, a bottom layer, a composite intermediate layer comprising relatively wide blocks of light weight material separated by relatively narrow strips of resilient material, and a layer of resilient material beneath the blocks and strips covering the adjacent edges of the blocks and strips, all of said layers being united to form a composite sole.

2. In a laminated sole construction a top layer, a bottom layer, a composite intermediate layer comprising relatively wide blocks of light weight material separated by relatively narrow strips of resilient material, and a layer of resilient material beneath the blocks and strips covering the adjacent edges of the blocks and strips, said resilient layer being adhesively united to the blocks and fused to the adjoining edges of the resilient strips to provide integral joints, all of said layers being united to form a composite sole.

3. In a laminated sole construction, a top layer, a bottom layer, a composite intermediate layer comprising relatively thick and relatively wide blocks of light weight material arranged crosswise of the sole, relatively narrow strips of resilient material arranged between the blocks of light weight material and extending crosswise of the sole and a layer of resilient material beneath the blocks and strips, all of said layers being united to form a composite sole.

4. In a laminated sole construction, a top layer, a bottom layer, a composite intermediate layer comprising relatively thick and relatively wide blocks of light weight material arranged crosswise of the sole, relatively narrow strips of resilient material arranged between the blocks of light weight material and extending crosswise of the sole and a layer of resilient material beneath the blocks and strips, said layer of resilient material covering the adjacent edges of the blocks and strips and being adhesively united to the blocks and fused to the edges of the strips, all of said layers being united to form a composite sole.

5. In a laminated sole construction, a top layer, a bottom layer, a composite intermediate layer comprising relatively wide blocks of cork, relatively narrow strips of crepe rubber arranged between the cork blocks and a layer of crepe rubber beneath the blocks and strips, all of said layers being united to form a composite sole.

6. In a laminated sole construction, a top layer, a bottom layer, a composite intermediate layer comprising relatively thick and relatively wide blocks of cork arranged crosswise of the sole, relatively narrow strips of crepe rubber arranged between the cork blocks and extending crosswise of the sole and a layer of crepe rubber beneath the blocks and strips, all of said layers being united to form a composite sole.

7. In a laminated sole construction, a top layer, a bottom layer, a composite intermediate layer comprising relatively thick and relatively wide blocks of cork arranged crosswise of the sole, relatively narrow strips of crepe rubber arranged between the cork blocks and extending crosswise of the sole and a layer of crepe rubber beneath the blocks and strips, said layer of crepe rubber covering the adjacent edges of the blocks and strips and being adhesively united to the blocks and fused to the edges of the strips, all of said layers being united to form a composite sole.

8. In a laminated sole construction, a top layer, a bottom layer, a composite intermediate layer comprising relatively wide blocks of cork, relatively narrow strips of crepe rubber arranged between the cork blocks and being adhesively united thereto and a layer of crepe rubber beneath the blocks and strips adhesively united to the blocks and fused to the strips, all of said layers being adhesively united together to form a composite sole.

9. In a laminated sole construction a top layer, a bottom layer, a composite intermediate layer comprising relatively wide blocks of light weight material separated by relatively narrow strips of resilient material, and a layer of resilient material beneath the blocks and strips covering the adjacent edges of the blocks and strips, and resilient layer and said top layer being adhesively united to the blocks and fused to the adjoining edges of the resilient strips to provide integral joints, all of said layers being united to form a composite sole.

10. In a laminated sole construction, a top layer, a bottom layer, a composite intermediate layer comprising relatively thick and relatively wide blocks of light weight material arranged crosswise of the sole, relatively narrow strips of resilient material arranged between the blocks of light weight material and extending crosswise of the sole and a layer of resilient material beneath the blocks and strips, said layer of resilient material covering the adjacent edges of the blocks and strips, said resilient layer and said top layer being adhesively united to the blocks and fused to the edges of the strips, all of said layers being united to form a composite sole.

11. In a laminated sole construction, a top layer, a bottom layer, a composite intermediate layer comprising relatively thick and relatively wide blocks of cork arranged crosswise of the sole, relatively narrow strips of crepe rubber arranged between the cork blocks and extending crosswise of the sole and a layer of crepe rubber beneath the blocks and strips, said layer of crepe rubber covering the adjacent edges of the blocks and strips, said layer of crepe rubber and said top layer being adhesively united to the blocks and fused to the edges of the strips, all of said layers being united to form a composite sole.

JACQUES MULLER.